No. 620,676. Patented Mar. 7, 1899.
C. D. SANDERSON & B. E. BANFIELD.
PUMP VALVE.
(Application filed Apr. 21, 1898.)
(No Model.)
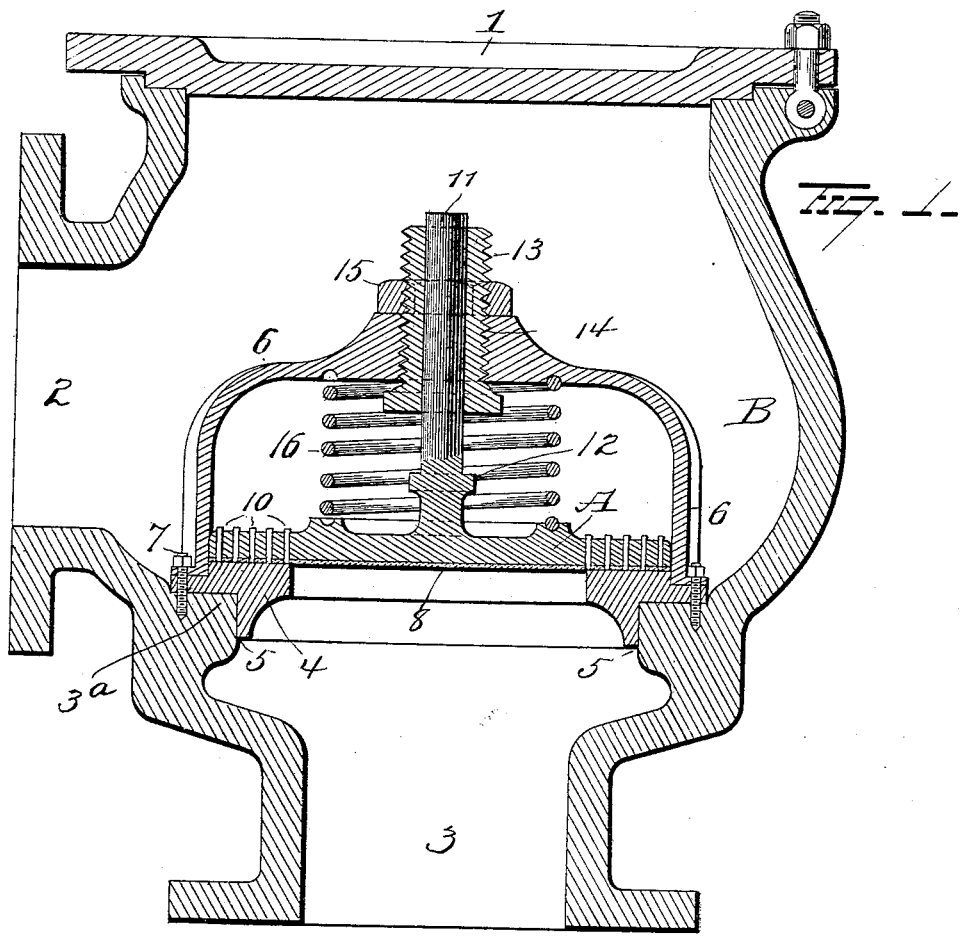
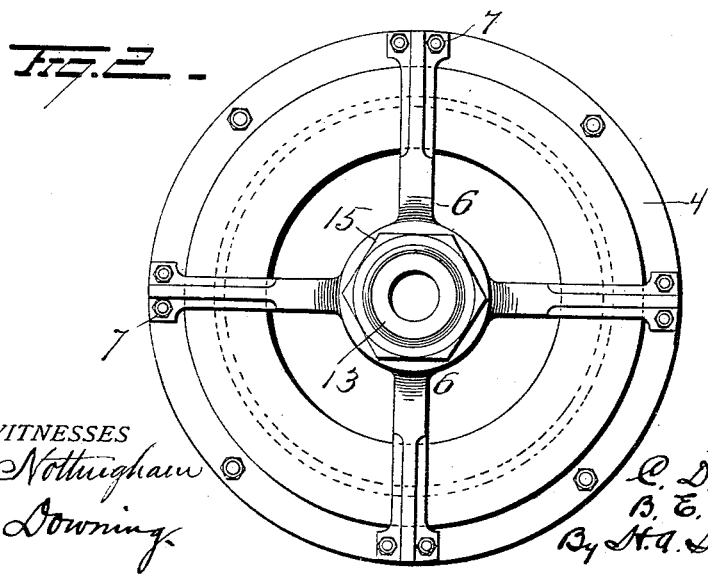
WITNESSES
E. J. Nottingham
G. F. Downing
INVENTORS
C. D. Sanderson
B. E. Banfield
By H. G. Seymour
Attorney

UNITED STATES PATENT OFFICE.

CHARLES DUDLEY SANDERSON, OF THROOP, AND BERTIE EDWIN BANFIELD, OF SCRANTON, PENNSYLVANIA.

PUMP-VALVE.

SPECIFICATION forming part of Letters Patent No. 620,676, dated March 7, 1899.

Application filed April 21, 1898. Serial No. 678,363. (No model.)

*To all whom it may concern:*

Be it known that we, CHARLES DUDLEY SANDERSON, of Throop, and BERTIE EDWIN BANFIELD, of Scranton, county of Lackawanna, and State of Pennsylvania, have invented certain new and useful Improvements in Pump-Valves; and we do hereby declare the following to be a full, clear, and exact description of the invention, such as will enable others skilled in the art to which it appertains to make and use the same.

Our invention relates to an improvement in pump-valves, the object of the invention being to provide simple and efficient means whereby the extent of movement of a valve can be regulated and adjusted as desired.

A further object is to provide an effectual means whereby to secure a face of leather or other suitable yielding material to the valve.

A further object is to provide a valve that will be simple in construction, cheap to manufacture, and most efficient when in use.

With these objects in view the invention consists in certain novel features of construction and combinations and arrangements of parts, as will be more fully described, and pointed out in the claims.

In the accompanying drawings, Figure 1 is a view in vertical section, and Fig. 2 is a detail view.

A represents our improved valve, and B a casing therefor. The casing B is provided with a removable top 1, an outlet 2, and inlet 3. The casing is provided internally with an annular shoulder 3ª, on which a valve-seat 4 is removably secured, said seat projecting in an opening 5 below the outlet 2 and above and in alinement with the inlet 3. A cage 6, provided with openings or slots to permit the passage of water therethrough, is secured to the annular shoulders 3ª of casing B and against the outer edge of the valve-seat 4 by means of bolts or screws 7. The valve A is provided with a face 8, of leather or other suitable yielding material, held in position by a series of wooden pegs 10, adapted to pass through holes provided in said valve. It will be understood that the wooden pegs, owing to their constant contact with the water, will swell and securely wedge themselves in place. The valve A is provided with a stem 11, on which is provided a stop 12 to engage the end of a sleeve 13, in which said stem is adapted to move. The sleeve 13 is provided with external screw-threads to mesh with corresponding screw-threads in a hole 14, provided in the top of the cage 6, and is adapted to be screwed up or down in said hole to lengthen or shorten the distance between its lower end and the stop 12 on the valve-stem 11 and limit or extend the upward movement of the valve. A nut 15 is screwed on collar 13 and adapted to bear against the top of the cage whereby to retain and securely lock the sleeve at any desired adjustment. A coiled spring 16 is disposed within said cage and bears at one end against the top thereof and at its other end against the top of the valve A to normally hold the valve against its seat.

It is evident that numerous slight changes might be made in the general form and arrangement of the several parts herein shown and described without departing from the spirit and scope of our invention, and hence we would have it understood that we do not wish to limit ourselves to the precise details herein set forth, but consider ourselves at liberty to make such slight changes and alterations as fairly fall within the spirit and scope of our invention.

Having fully described our invention, what we claim as new, and desire to secure by Letters Patent, is—

1. The combination with a valve-casing, of a removable valve-seat therein, a cage located within the valve-casing and over the valve-seat, a series of fastening devices normally securing said valve-seat and cage in place, said cage having a screw-threaded hole in its top, an adjustable screw-threaded sleeve extending through said hole in the cage, said sleeve depending within and projecting above the cage, a lock-nut for said adjustable sleeve, a valve on the valve-seat and guided by the cage, a stem projecting from the valve and passing freely through said adjustable sleeve, a stop on said stem adapted to engage the adjustable sleeve and a spring disposed within the cage and bearing at its respective ends against the valve and top of the cage, substantially as set forth.

2. The combination with a valve-casing and a valve therein, of a cage secured in said casing, a seat for said valve, said valve having holes, wooden pegs passing through said holes and a leather face on said valve secured thereto by means of said pegs.

3. The combination with a valve and a seat therefor, said valve having holes therein, of a leather face for said valve and wooden pegs adapted to pass through said holes and secure the leather to said valve.

4. The combination with a valve having holes and a yielding facing for said valve, of wooden pegs passing through the valve and securing the facing thereto, substantially as set forth.

In testimony whereof we have signed this specification in the presence of two subscribing witnesses.

CHARLES DUDLEY SANDERSON.
BERTIE EDWIN BANFIELD.

Witnesses:
PHILIP H. FRYER,
W. J. MCGRATH.